(12) United States Patent
Kim (10) Patent No.: US 9,894,346 B2
(45) Date of Patent: Feb. 13, 2018

(54) APPARATUS AND METHOD FOR PRODUCING NEW 3D STEREOSCOPIC VIDEO FROM 2D VIDEO

(71) Applicant: ELECTRONICS AND TELECOMMUNICATIONS RESEARCH INSTITUTE, Daejeon (KR)

(72) Inventor: Hye Sun Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 265 days.

(21) Appl. No.: 14/813,375

(22) Filed: Jul. 30, 2015

(65) Prior Publication Data

US 2016/0261847 A1 Sep. 8, 2016

(30) Foreign Application Priority Data

Mar. 4, 2015 (KR) ........................ 10-2015-0030521

(51) Int. Cl.
*H04N 13/00* (2006.01)
*H04N 13/02* (2006.01)

(52) U.S. Cl.
CPC ... *H04N 13/026* (2013.01); *H04N 2013/0092* (2013.01)

(58) Field of Classification Search
None
See application file for complete search history.

(56) References Cited

U.S. PATENT DOCUMENTS

| 8,917,954 | B2 | 12/2014 | Kim et al. | |
|---|---|---|---|---|
| 2006/0143020 | A1* | 6/2006 | Zaima | H04N 13/0003 382/154 |
| 2008/0150945 | A1* | 6/2008 | Wang | G06K 9/20 345/427 |
| 2011/0050864 | A1* | 3/2011 | Bond | H04N 13/026 348/51 |
| 2011/0069152 | A1* | 3/2011 | Wang | H04N 13/026 348/43 |
| 2011/0149039 | A1 | 6/2011 | Kim et al. | |
| 2012/0183202 | A1* | 7/2012 | Wei | H04N 13/026 382/154 |
| 2013/0057647 | A1* | 3/2013 | Moon | H04N 13/026 348/43 |
| 2013/0070050 | A1* | 3/2013 | Ha | H04N 5/144 348/43 |

(Continued)

FOREIGN PATENT DOCUMENTS

JP 2004-145832 A 5/2004
KR 10-2013-0026078 A 3/2013

*Primary Examiner* — Reza Aghevli
(74) *Attorney, Agent, or Firm* — LRK Patent Law Firm (57) ABSTRACT

Provided are an apparatus and method for producing new 3D stereoscopic video from 2D video. The method for producing new 3D stereoscopic video from 2D video, which may be implemented by a computer, includes segmenting input 2D video into work clips in units of cuts, generating object region extraction information from each of the work clips, and generating stereoscopic conversion work directives for each of the work clips on the basis of the object region extraction information.

11 Claims, 7 Drawing Sheets

(56) References Cited

U.S. PATENT DOCUMENTS

| | | |
|---|---|---|
| 2013/0147911 A1* | 6/2013 | Karsch ................. H04N 13/026 348/43 |
| 2013/0162768 A1 | 6/2013 | Lie et al. |
| 2013/0222543 A1* | 8/2013 | Bae ......................... G01S 17/89 348/46 |
| 2013/0258062 A1 | 10/2013 | Noh et al. |
| 2013/0286017 A1* | 10/2013 | Marimon Sanjuan .. G06T 15/00 345/427 |
| 2014/0210944 A1* | 7/2014 | Jeong ................. H04N 13/0264 348/43 |
| 2014/0267601 A1 | 9/2014 | Huber et al. |
| 2015/0156475 A1* | 6/2015 | Wu ..................... H04N 13/026 348/46 |
| 2015/0212687 A1* | 7/2015 | Nam ................... G06F 3/04815 715/723 |
| 2015/0379720 A1* | 12/2015 | Herraez ............... H04N 13/026 348/43 |

* cited by examiner

| 21 | 21a | 21b | 21c | 21d |
|---|---|---|---|---|
| | Layer | Color | Quality | Memo |
| 1 | LAKE | – – – | LOW | LAKE TO BE LARGE |
| 2 | RIGHT SMALL MOUNTAIN | | MEDIUM | |
| 3 | MIDDLE MOUNTAIN | | HIGH | |
| 4 | RIGHT REAR MOUNTAIN | | MEDIUM | |
| 5 | LEFT REAR MOUNTAIN | | MEDIUM | |
| 6 | MIDDLE REAR MOUNTAIN | | MEDIUM | |

FIG. 4B

| | Layer | Color | Depth Type | Min Depth | Max Depth | Memo |
|---|---|---|---|---|---|---|
| 1 | LAKE | | Linear | 200.00 | 255.00 | LAKE TO BE LARGE |
| 2 | RIGHT SMALL MOUNTAIN | | Linear | 190.00 | 180.00 | |
| 3 | MIDDLE MOUNTAIN | | Quadric | 170.00 | 200.00 | |
| 4 | RIGHT REAR MOUNTAIN | | Linear | 130.00 | 170.00 | |
| 5 | LEFT REAR MOUNTAIN | | Cylinder | 150.00 | 180.00 | |
| 6 | MIDDLE REAR MOUNTAIN | | Linear | 0.00 | 10.00 | |

APPARATUS AND METHOD FOR PRODUCING NEW 3D STEREOSCOPIC VIDEO FROM 2D VIDEO

CROSS-REFERENCE TO RELATED APPLICATIONS

This application claims priority under 35 U.S.C. § 119 to Korean Patent Application No. 10-2015-0030521, filed on Mar. 4, 2015, the disclosure of which is incorporated herein by reference in its entirety.

BACKGROUND OF THE INVENTION

1. Field of the Invention

The present invention relates to an apparatus and method for producing new 3D stereoscopic video from 2D video, and more particularly, to a method for producing new 3D stereoscopic video from 2D video in order for a work manager to effectively deliver stereoscopic directing results to sub-workers.

2. Description of Related Art

Recently, as 3D displays have become prevalent due to the development of technologies, consumer demand for 3D images has also increased. Thus, in order to provide insufficient 3D images, a method of converting existing 2D images into 3D images has been commonly used. However, conversion of a 2D image into a 3D image is so complicated and elaborate that it is manually performed in many cases, causing a problem in that professional manpower and a great amount of time are required. Thus, recently, tools for automatically converting images have been developed.

In order to generate a stereoscopic image, a background and an object are segmented, and a depth value is given to the segmented object or a 3D object is generated and fit to a 2D image to obtain a depth map. Rendering is performed by using the depth map or the 3D object to generate left and right eye images. The operations from the object segmentation and stereoscopic image generation need to be configured in an effective pipeline form; however, currently, the operations are separately performed in different tools. Thus, if compatibility between tools is not supported or if a format is not supported, efficiency and quality of production are degraded.

Also, in order to convert a 2D image into a 3D stereoscopic image, 3D space depth information that cannot be expressed in a 2D image should be artificially generated. A 3D stereoscopic image may be generated by providing appropriate depth information to objects of a 2D image. Here, if workers arbitrarily provide depth information to objects or work clips of an image, space information of an overall stereoscopic conversion outcome may lack consistency.

For a 2D to 3D conversion requiring large-scale manual operations, it is very intricate to give instructions to several workers one by one. In particular, without a work manager or a system for managing overall conversion operation, it may be difficult to maintain consistency of overall stereoscopic operations.

SUMMARY

Accordingly, the present invention provides an apparatus and method for effectively producing new 3D stereoscopic video from 2D video, by allowing work managers to control an overall 3D effect of an image and provide a space depth sense to objects (entities) or work image clips.

The present invention also provides an apparatus and method for producing new 3D stereoscopic video from 2D video in order to effectively deliver (or transfer) stereoscopic space information directed by a work manager to an actual worker.

The object of the present invention is not limited to the aforesaid, but other objects not described herein will be clearly understood by those skilled in the art from descriptions below.

In one general aspect, a method for producing new 3D stereoscopic video from 2D video, which may be implemented by a computer, includes: segmenting input 2D video into work clips in units of cuts; generating object region extraction information from each of the work clips; and generating stereoscopic conversion work directives for each of the work clips on the basis of the object region extraction information.

The generating of object region extraction information may include: determining a method for extracting an object region from each of the work clips and work quality.

The generating of object region extraction information may include: receiving a user input for designating an object region in each of the work clips; and managing the object regions designated according to the user input in units of layers.

The generating of object region extraction information may include providing a user interface for designating at least one of a method for providing depth information to an object region extracted from each of the work clips, a maximum depth value of each of the object regions, and a minimum depth value of each of the object regions.

The generating of object region extraction information may include: determining a maximum depth value and a minimum depth value of each of the object regions extracted from the work clips; and displaying a top view (or a planar image) visualizing the object regions having the determined maximum depth values and minimum depth values, in a 3D space viewed from above at a right angle.

The top view may include a plurality of polygons having different sizes and positions according to the determined maximum depth values and minimum depth values of objects.

The generating of object region extraction information may include: providing a user interface for changing the sizes and positions of the plurality of polygons; and visually changing depth values of the objects by changing the sizes and positions of the plurality of polygons by using the user interface.

The generating of the stereoscopic conversion work directives may include: delivering the work clips and stereoscopic conversion work directives regarding the work clips to sub-workers of corresponding work clips, wherein the stereoscopic conversion work directives may include information of an object region extracted in units of layers from a corresponding work clip, a method for providing depth information to a specific object region, a maximum depth value and a minimum depth value of the specific object region.

In another general aspect, an apparatus for producing new 3D stereoscopic video from 2D video, includes at least one processor and a non-volatile memory storing a code executed by the at least one processor, wherein the at least one processor includes: an image segmenting unit configured to segment input 2D video into work clips in units of cuts; an object region determining unit configured to determine an object region extracted from each of the work clips; an object depth value determining unit configured to determine a depth value of each of the extracted object regions; and a stereoscopic conversion work directives generating unit configured to generate stereoscopic conversion work directives for each of the work clips on the basis of object region extraction information including the determined depth value information of each of the extracted object regions.

The object region determining unit may receive a user input for designating an object region of each of the work clips, and manage the object region designated according to the user input in units of layers.

The object depth value determining unit may provide a user interface for designating at least one of a method for providing depth information to an object region extracted from each of the work clips, a maximum depth value of each of the object regions, and a minimum depth value of each of the object regions.

The object depth value determining unit may determine a maximum depth value and a minimum depth value of each of the object regions extracted from the work clips and display a top view (or a planar image) visualizing the object regions having the determined maximum depth values and minimum depth values, in a 3D space viewed from above at a right angle.

The top view may include a plurality of polygons having different sizes and positions according to the determined maximum depth values and minimum depth values of objects.

The object depth value determining unit may provide a user interface for changing the sizes and positions of the plurality of polygons and visually change depth values of the objects by changing the sizes and positions of the plurality of polygons by using the user interface.

The stereoscopic conversion work directives generating unit may deliver the work clips and stereoscopic conversion work directives regarding the work clips to sub-workers of corresponding work clips, wherein the stereoscopic conversion work directives may include information of an object region extracted in units of layers from a corresponding work clip, a method for providing depth information to a specific object region, a maximum depth value and a minimum depth value of the specific object region.

Other features and aspects will be apparent from the following detailed description, the drawings, and the claims.

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terms used herein are for the purpose of describing particular embodiments only and are not intended to be limiting of example embodiments. As used herein, the singular forms "a," "an" and "the"' are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments of the present invention will be described in detail with reference to the accompanying drawings. In adding reference numerals for elements in each figure, it should be noted that like reference numerals already used to denote like elements in other figures are used for elements wherever possible. Moreover, detailed descriptions related to well-known functions or configurations will be ruled out in order not to unnecessarily obscure subject matters of the present invention.

In this disclosure, "2D video" refers to video captured in a 2D manner. Thus, when 2D video is played, it may be recognized as a 2D image having only a "width" and "height". As being obvious to a person skilled in the art, video includes sequential image frames. Here, an image frame includes an array of pixels. 2D video may include one or more scenes. Here, each of the scenes may include one or more image frames.

Also, in this disclosure, "stereo video" refers to a form of multi-view video including a left view and a right view. Thus, when stereo video (or 3D video) is played, it may be recognized as a 3D image having a "width", a "height", and a "depth".

Also, in this disclosure, "cut" or "scene" refers to a film captured in a single camera position, which is a minimum unit in direction (or production). Hereinafter, the two terms of "cut" and "scene" will be mixedly used and have the same meaning.

Figure 1:
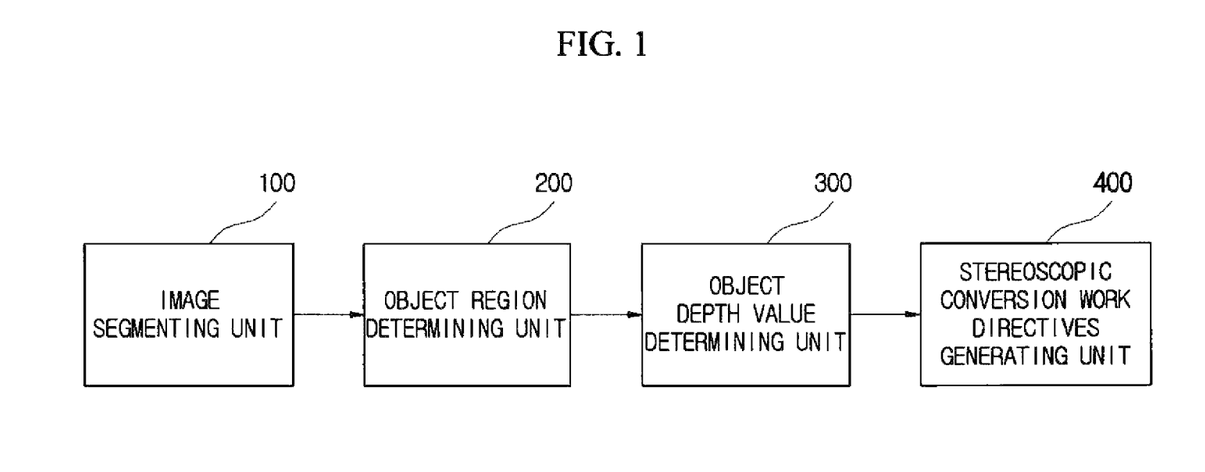
FIG. 1 is a block diagram illustrating a configuration of an apparatus for producing new 3D stereoscopic video from 2D video according to an embodiment of the present invention.

Hereinafter, an apparatus for producing new 3D stereoscopic video from 2D video according to an embodiment of the present invention will be described. FIG. 1 illustrates an apparatus for producing new 3D stereoscopic video from 2D video according to an embodiment of the present invention.

Referring to FIG. 1, the apparatus for producing new 3D stereoscopic video from 2D video according to an, embodiment of the present invention includes an image segmenting unit 100, an abject region determining unit 200, an object depth value determining unit 300, a stereoscopic conversion work directives generating unit 400.

The image segmenting unit 100 classifies an input 2D video into work clips in units of cuts and stores the classified work clips.

For example, the 2D video may be classified into a plurality of scenes (Cut_#1, Cut_#2, Cut_#3, . . . , Cut_#25), and each of the scenes includes a plurality of image frames.

Here, the cuts are classified with respect to a point at which contents of an image is rapidly changed. For example, in image sequences, a scene of Cut_#1 may include a total of 500 image frames from image frame #0 to image frame #499, and a scene of Cut_#25 includes a total of 31 image frames from an image frame #1327 to an image frame #1357.

In this manner, the apparatus for producing new 3D stereoscopic video from 2D video according to an embodiment of the present invention automatically classifies the input 2D video into work clips in units of cuts, thus allowing a worker to easily process images of each scene.

The object region determining unit 200 determines a method for extracting an object region and precision for each work clip.

If a sub-worker with respect to each work clip arbitrarily extracts an object region without determining an extraction method and precision (object extraction work quality) of an object region, or the like, objects of an overall image may lose consistency of stereoscopic quality, and thus, determination of an extraction method and precision of an object region is a very important stereoscopic directing work.

An embodiment of the present invention provides a scheme for allowing a work manager to easily determine an object region and designating the object region directly with a curved line or a polyline on a representative image of a work clip such that a sub-worker regarding the corresponding work clip may receive the object region.

Figure 2:
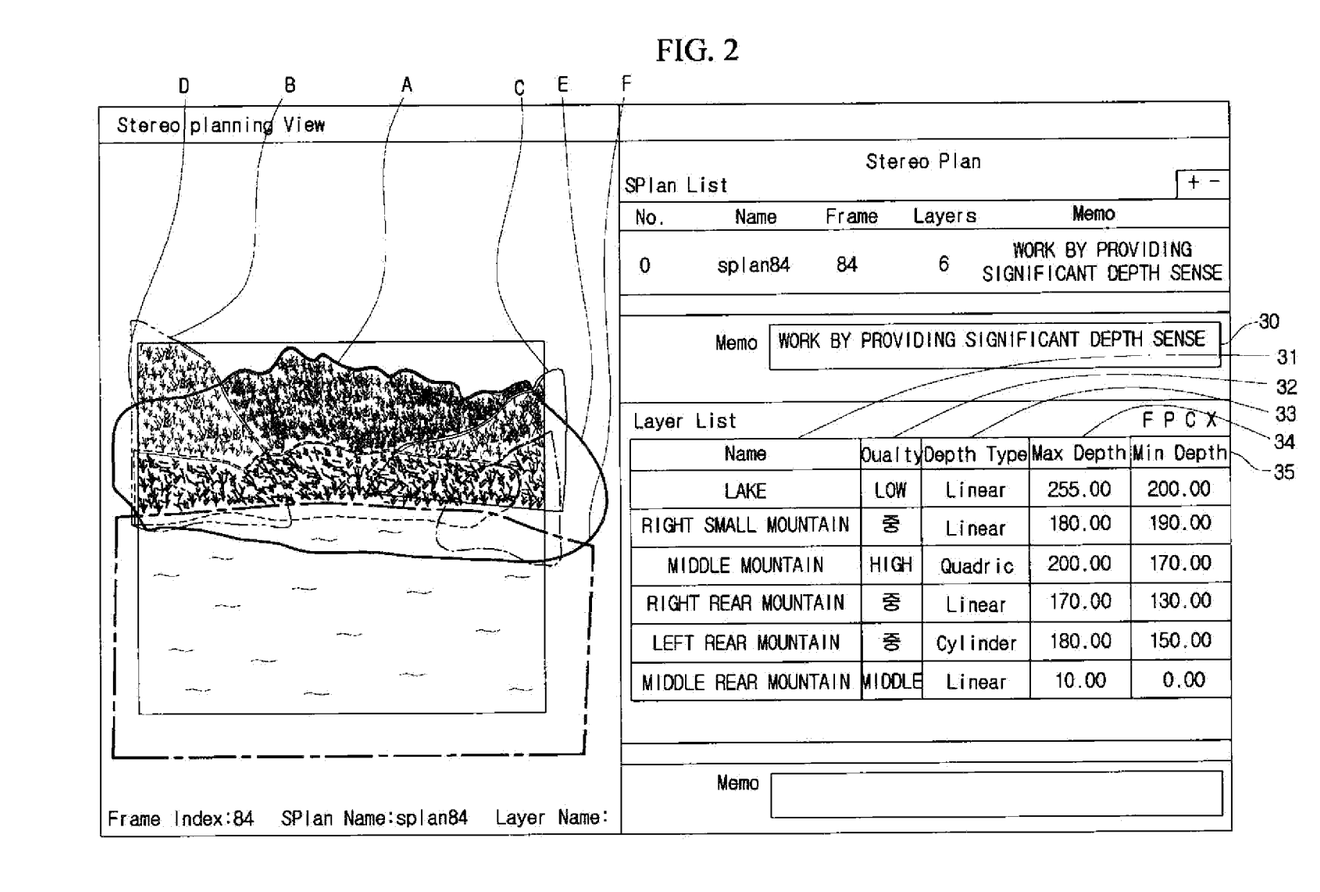
FIG. 2 is a view illustrating an example of determining an object extraction region of an image and providing depth information thereto according to an embodiment of the present invention.

FIG. 2 is a view illustrating an example of determining an object extraction region of an image and providing depth information thereto according to an embodiment of the present invention. As illustrated in FIG. 2, when a work manager draws the edge of an object region by using a mouse or a tablet pen on a representative image of a work clip, object regions A, B, C, D, E, and F are automatically designated and classified.

Here, the object regions are managed by layer unit 30, and the object region determining unit 200 provides a user interface for inputting an object extraction work quality level of each of the object regions managed by the layer unit. Object region extraction information determined by the work manager is thereafter generated as work directives and delivered to a sub-worker of a corresponding work clip.

An ultimate goal for extracting object regions of an image is to provide natural, consistent depth values to the object regions. The depth values include maximum and minimum depth information occupied by the object regions in a 3D space and depth information providing method.

Referring to FIG. 2, the object depth value determining unit 300 provides a user interface for designating at least one of the method for providing depth information and maximum and minimum depth values for object regions extracted from a work clip.

For example, it is assumed that the object region determining unit 200 extracts a middle rear mountain A, a left rear mountain B, a right rear mountain C, a middle mountain D, a right small mountain E, and a lake F as object regions, on the basis of inputs from the work manager, and the extracted object regions are managed by the layer unit 30 so that object extraction work quality of each of the object regions is designated as high, middle, and low.

Here, the work manager inputs a depth information providing method 33, maximum depth information 34, and minimum depth information 35 by using a user interface provided by the object depth value determining unit 300. For example, as the depth information providing method 33, linear, cylinder, radial, quadric depth value editing templates may be applied.

Also, when the depth information providing method and the maximum and minimum depth information are determined for the object regions, the object depth value determining unit 300 displays a top view (or a planar image) visualizing the object regions of the 3D space viewed from above to allow the work manager to easily check the depth information providing method and the maximum and minimum depth information.

Figure 3A:
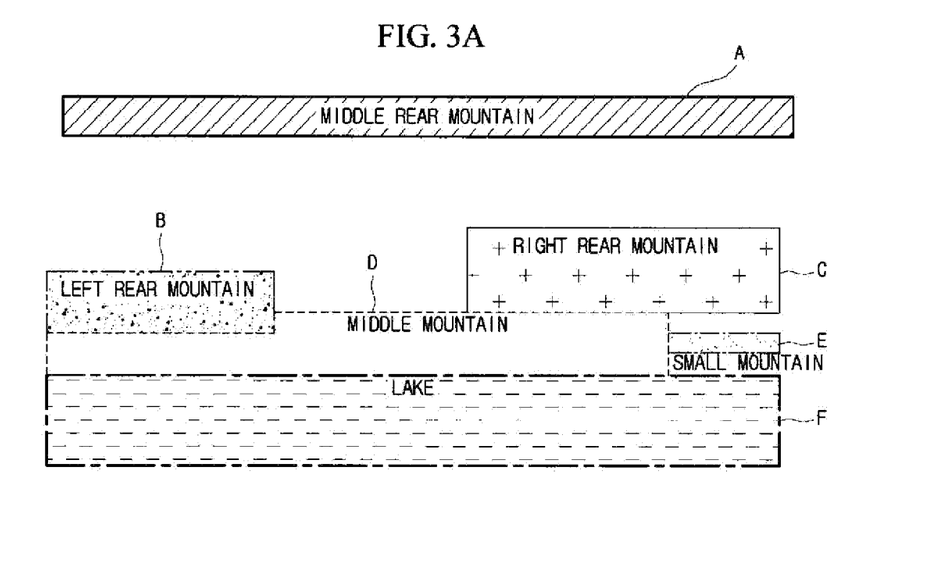
FIG. 3A is a view illustrating an example of viewing depth information provided to objects from above at a right angle according to an embodiment of the present invention.
Figure 3B:
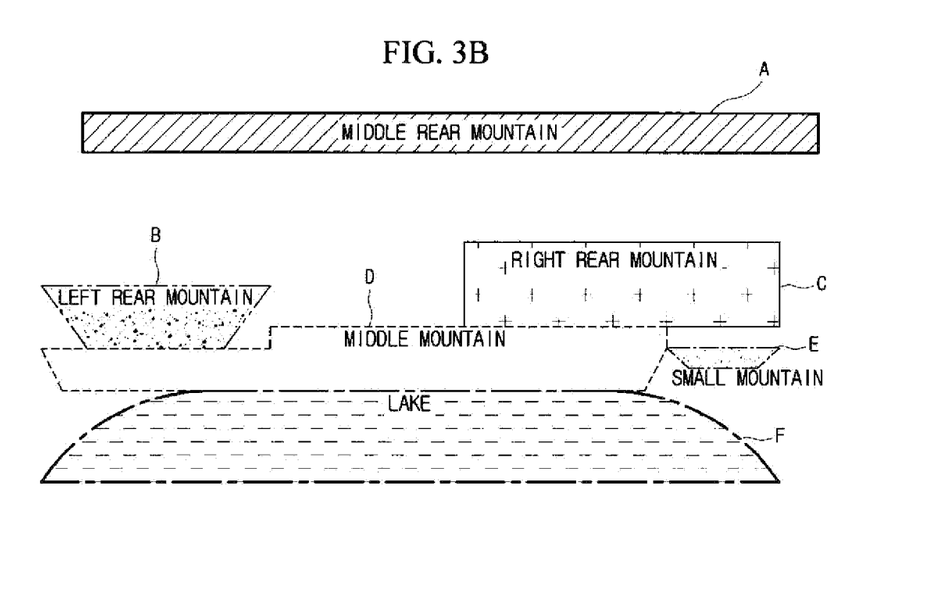
FIG. 3B is a view illustrating another example of viewing depth information provided to objects from above at a right angle according to an embodiment of the present invention.

As illustrated in FIGS. 3A and 3B, the top view may include a plurality of polygons having different sizes and positions according to the maximum depth value and the minimum depth value determined for the objects.

For example, when depth information of each of the object regions is determined on the assumption that the work manager looks the middle rear mountain from a position closest to the lake, the lake may be positioned at the closest distance to the work manager and the middle rear mountain may be positioned at the farthest distance. In this manner, the maximum and minimum depth information determined to express a depth sense from a specific position may be expressed as the top view illustrated in FIG. 3 so as to be viewed to the work manager.

Here, the sizes of polygons are proportional to sizes of the object regions designated in the work clip, and positions of the polygons are determined according to the maximum and minimum depth information input by the work manager.

Also, the object depth value determining unit 300 may provide a user interface for changing sizes and positions of the plurality of polygons, and when the work manager changes the sizes and positions of the plurality of polygons using the provided user interface, the object depth value determining unit 300 may visually change depth values of the objects.

The user interface provided in the form of a top view by the object depth value determining unit 300 helps the user to recognize dispositions and depth values of the entire objects at a glance. In particular, in complicated image space editing, the objects are simplified to be displayed as simple diagrams, allowing the user to recognize spatial dispositions of the objects at a glance.

In the user interface provided in the form of a top view, depth values of the objects are geometricized, and thus, the user may visually edit the depth values of the objects by using an input tool such as a mouse, tablet, and the like. In particular, in the case of the rectangular depth value bounding boxes illustrated in FIG. 3A, sizes and positions of depth values may be changed by pulling or moving control points (for example, each of vertices or edges).

Also, as illustrated in FIG. 3B, when depth value information of each object may be edited in the form of various figures, rather than in the form of rectangular bounding boxes, editing depth values may be various and specifically devised. For example, when various figure templates such as a polygonal shape (a triangular shape, a trapezoidal shape, or an octagonal shape), a semi-circular shape, and an oval shape are provided in the user interface provided in the form of a top view, the user may be able to apply a figure having a desired shape to a corresponding object. Here, like the rectangular depth value bounding boxes described above with reference to FIG. 3A, a user interface allowing the user to arbitrarily move controls points set for the figures.

The stereoscopic conversion work directives generating unit 400 generates stereoscopic conversion work information directed by the work manager, as work directives, and delivers the generated work directives to a corresponding sub-worker of each work clip.

Figure 4A:
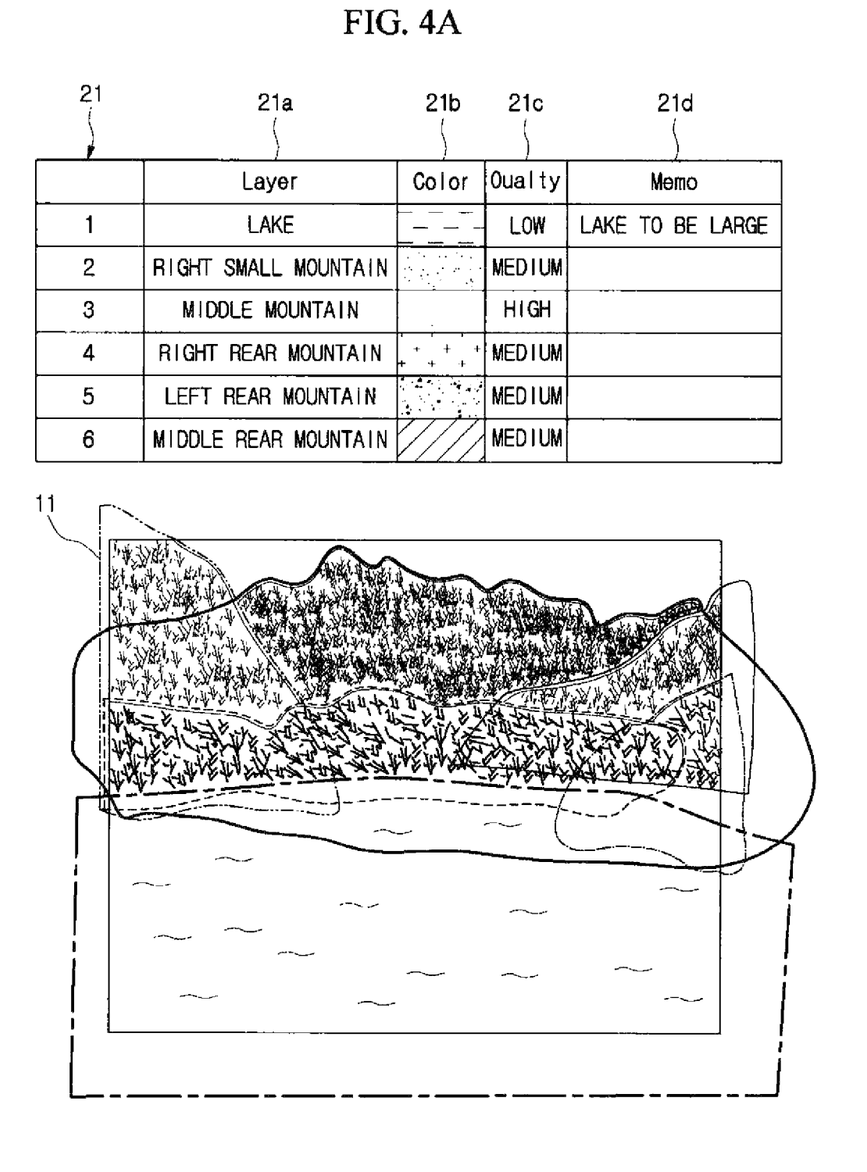
FIG. 4A and 4B are a view illustrating an example of work directives delivered to a sub-worker according to an embodiment of the present invention.
Figure 4B:
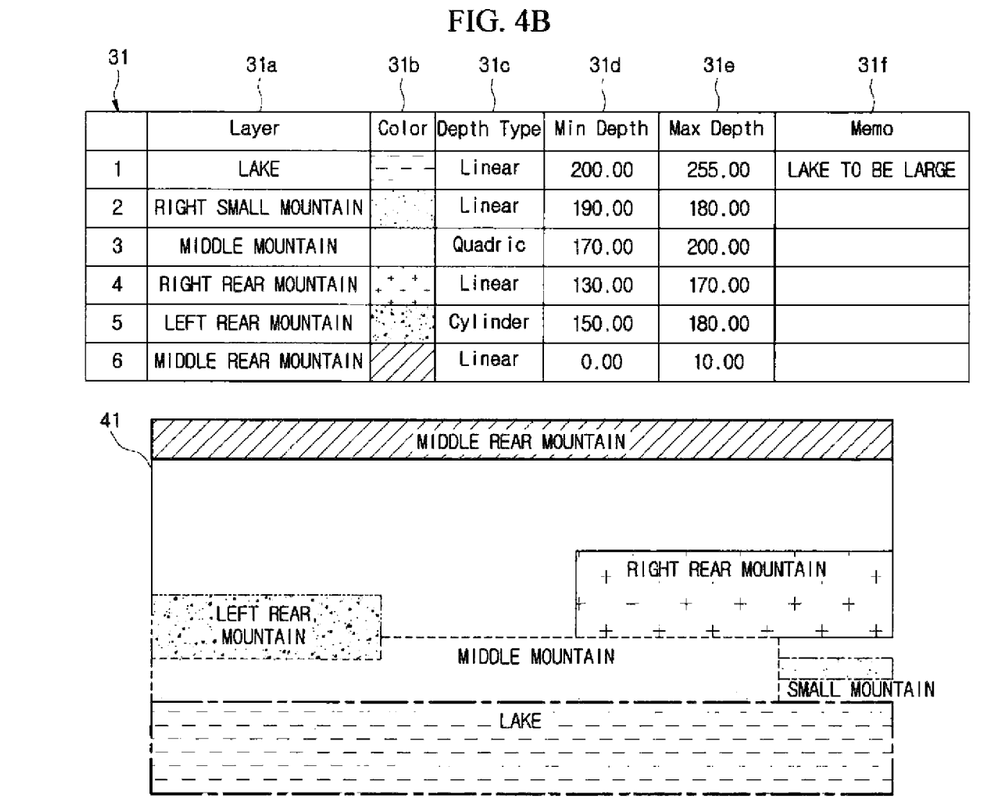

FIG. 4 is a view illustrating an example of work directives delivered to a sub-worker according to an embodiment of the present invention.

Referring to FIG. 4, the work directives delivered to the sub-worker are visualized to a plurality of figures and tables such that the stereoscopic depth information determined by the work manager may be effectively delivered.

For example, the work directives may include a work clip 11 including object region extraction information, a table 21 including object extraction work quality information, a table 31 including maximum and minimum depth information occupied by each object region in a 3D space and depth information providing method, and a top view 41 visualizing determined depth as a cross-section.

Here, the table 21 including object extraction work quality information may include corresponding work clip information, layer information 21a, layer classification information 21b, object extraction work quality information 21c, and a work memo 21d.

The table 31 including maximum and minimum depth information occupied by each object region in a 3D space and depth information providing method may include corresponding work clip information, layer information 31a, layer classification information 31b, depth information providing method 31c, minimum depth information 31d, maximum depth information 31e, and a work memo 31f.

So far, the apparatus for producing new 3D stereoscopic video from 2D video according to an embodiment of the present invention has been described with reference to FIGS. 1 through 4. Hereinafter, a method for producing new 3D stereoscopic video from 2D video according to another embodiment of the present invention will be described with reference to FIG. 5.

Figure 5:
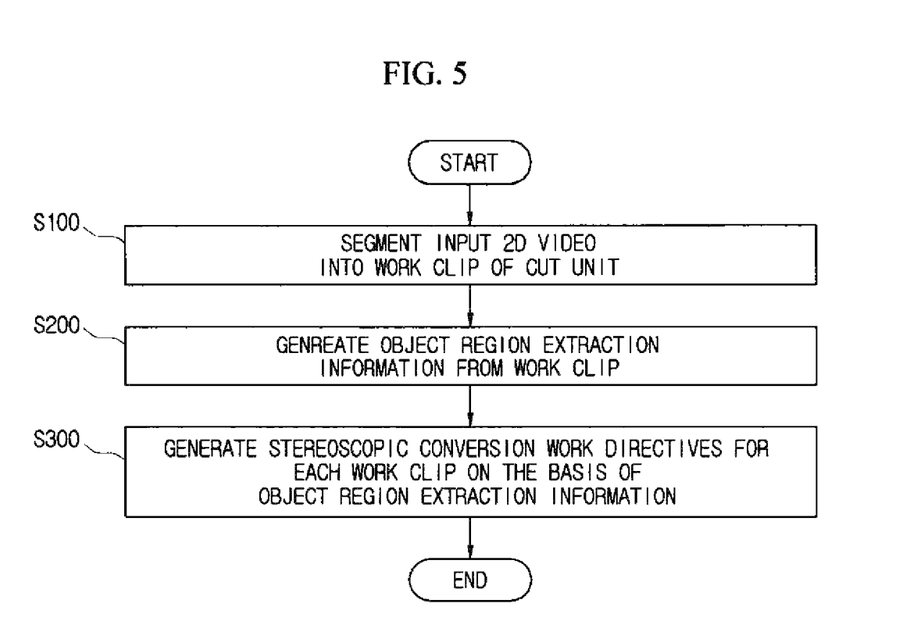
FIG. 5 is a flow chart illustrating a method for producing new 3D stereoscopic video from 2D video according to an embodiment of the present invention.

FIG. 5 is a flow chart illustrating a method for producing new 3D stereoscopic video from 2D video according to an embodiment of the present invention.

Referring to FIGS. 1 and 5, the image segmenting unit 100 segments input 2D video into a work clip in units of cuts (S100). In the large-scale stereoscopic image conversion work, the work manager may need to easily manage the overall 2D video in order to control the work overall. However, as a play time of an image is lengthened, the number of image frames to be controlled is rapidly increased. Thus, in an embodiment of the present invention, input 2D video is segmented into work clips in units of cuts so as to be managed. The cuts are classified with respect to points where contents of the image are rapidly changed.

Thereafter, the object region determining unit 200 and the object depth value determining unit 300 generate object region extraction information from the work clip (S200).

The object region determining unit 200 determines an object region determines a method for extracting an object region from the work clip and work quality. For example, the object region determining unit 200 may receive a user input which has designated an object region from the work clip, and manages the designated object region in units of layers. Here, the object region determining unit 200 provides a user interface for inputting object extraction work quality information, and the work manager inputs object extraction work quality information as information regarding the corresponding object region by using the user interface.

Also, the object depth value determining unit 300 provides a user interface for designating at least one of a depth information providing method, a maximum depth value, and a minimum depth value for the object region extracted from the work clip, and the work manager inputs at least one information among the depth information providing method, the maximum depth value, and the minimum depth value, as work information for the corresponding object region by using the user interface.

When the information such as the depth information providing method, the maximum depth value, and the minimum depth value are input by the work manager, the object depth value determining unit 300 displays a top view visualizing the object region having the determined maximum depth value and minimum depth, in a 3D space viewed from above at a right angle.

The top view includes a plurality of polygons having sizes and positions different according to maximum depth values and minimum depth value respectively determined for objects. The object depth value determining unit 300 provides a user interface for changing sizes and positions of the plurality of polygons, and when the work manager changes the sizes and positions of the plurality of polygons by using the user interface, the object depth value determining unit 300 visually changes and displays depth values of the objects.

Subsequently, the stereoscopic conversion work directives generating unit 400 generates stereoscopic conversion work directives for each work clip on the basis of the object region extraction information in step S300.

The stereoscopic conversion work directives generating unit 400 delivers the work clip and the stereoscopic conversion work directives for the work clip to a sub-worker of the corresponding work clip. The work directives may include at least one of information of the object region extracted in units of layers, the method for providing depth information to a specific object region, and the maximum depth value and the minimum depth value of the particular object region.

Figure 6:
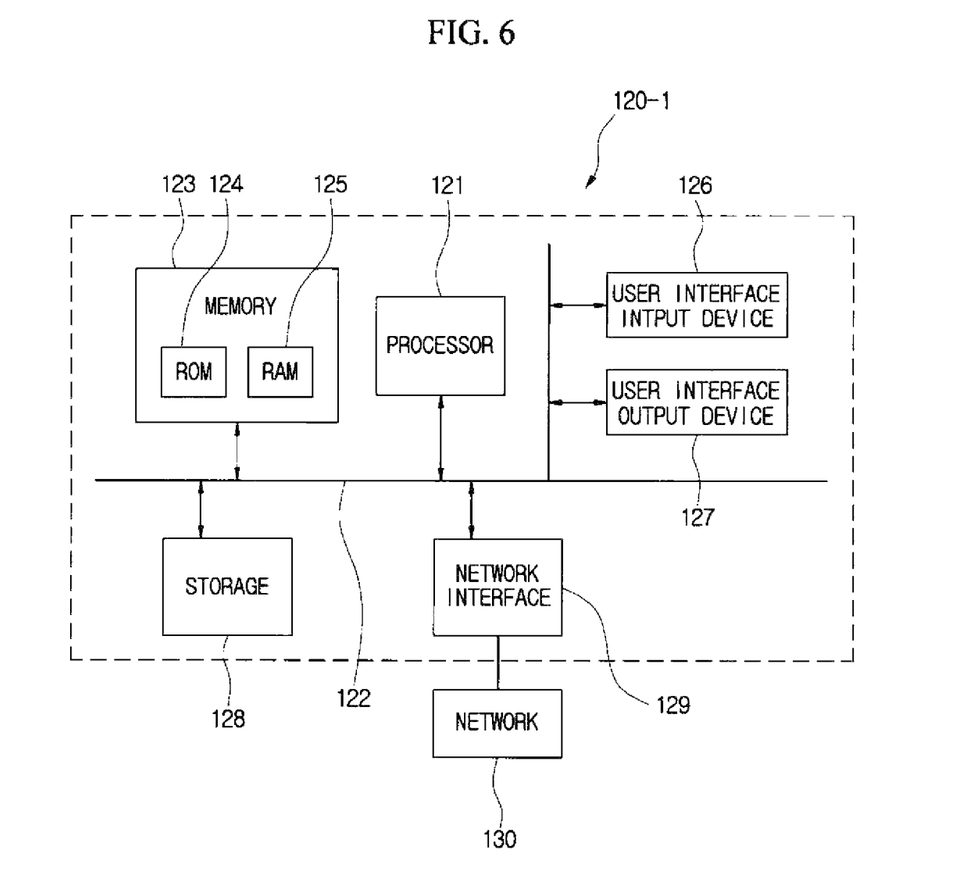
FIG. 6 is a view illustrating an example of a computer system in which a method for producing new 3D stereoscopic video from 2D video according to an embodiment of the present invention is performed.

According to the present invention, when new 3D stereoscopic video is produced from 2D video, the work manager may conveniently direct and control the overall stereoscopic conversion work, and each sub-worker may effectively recognize a direction intention of the work manager, thus effectively performing the overall work, The method for producing new 3D stereoscopic video from 2D video according to an embodiment of the present invention may be implemented in a computer system or may be recorded in a recording medium. FIG. 6 illustrates a simple embodiment of a computer system. As illustrated, the computer system may include one or more processors 121, a memory 123, a user input device 126, a data communication bus 122, a user output device 127, a repository 128, and the like. These components perform data communication through the data communication bus 122.

Also, the computer system may further include a network interface 129 coupled to a network. The processor 121 may be a central processing unit (CPU) or a semiconductor device that processes a command stored in the memory 123 and/or the repository 128.

The memory 123 and the repository 128 may include various types of volatile or non-volatile storage mediums. For example, the memory 123 may include a ROM 124 and a RAM 125.

Thus, the method for producing new 3D stereoscopic video from 2D video according to an embodiment of the present invention may be implemented as a method that can be executable in the computer system. When the method for producing new 3D stereoscopic video from 2D video according to an embodiment of the present invention is performed in the computer system, computer-readable commands may perform the producing method according to the present invention.

As described above, according to the present invention, when new 3D stereoscopic video is produced from 2D video, a work manager may conveniently direct and control the overall stereoscopic conversion operation, and each of sub-workers may effectively recognize a directing intention of the work manager, thus effectively performing the overall operation.

The method for producing new 3D stereoscopic video from 2D video according to the present invention may also be embodied as computer-readable codes on a computer-readable recording medium. The computer-readable recording medium is any data storage device that may store data which may be thereafter read by a computer system. Examples of the computer-readable recording medium include read-only memory (ROM), random access memory (RAM), CD-ROMs, magnetic tapes, floppy disks, and optical data storage devices. The computer-readable recording medium may also be distributed over network coupled computer systems so that the computer-readable code may be stored and executed in a distributed fashion.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for producing new 3D stereoscopic video from 2D video, which can be implemented by a computer, the method comprising:
   segmenting input 2D video into work clips in units of cuts;
   generating object region extraction information from each of the work clips, wherein the generating of object region extraction information includes:
   determining a maximum depth value and a minimum depth value of each of the object regions extracted from the work clips, and
   displaying a top view visualizing the object regions having the determined maximum depth values and minimum depth values, in a 3D space viewed from above at a right angle, wherein the top view includes a plurality of polygons having different sizes and positions according to the determined maximum depth values and minimum depth values of objects, wherein object regions with a minimum depth value appear at the bottom of the top view and object regions with a maximum depth value appear at the top of the top view; and
   generating stereoscopic conversion work directives for each of the work clips on the basis of the object region extraction information.

2. The method of claim 1, wherein the generating of object region extraction information includes: determining a method for extracting an object region from each of the work clips and work quality.

3. The method of claim 1, wherein the generating of object region extraction information includes: receiving a user input for designating an object region in each of the work clips; and managing the object regions designated according to the user input in units of layers.

4. The method of claim 1, wherein the generating of object region extraction information includes: providing a user interface for designating at least one of a method for providing depth information to an object region extracted from each of the work clips, a maximum depth value of each of the object regions, and a minimum depth value of each of the object regions.

5. The method of claim 1, wherein the generating of object region extraction information includes:
   providing a user interface for changing the sizes and positions of the plurality of polygons; and
   visually changing depth values of the objects by changing the sizes and positions of the plurality of polygons by using the user interface.

6. The method of claim 1, wherein
   the generating of the stereoscopic conversion work directives includes: providing the work clips and stereoscopic conversion work directives generated for the work clips to a user interface, and
   the stereoscopic conversion work directives includes information of an object region extracted in units of layers from a corresponding work clip, a method for providing depth information to a specific object region, a maximum depth value and a minimum depth value of the specific object region.

7. An apparatus for producing new 3D stereoscopic video from 2D video, comprising:
   a server comprising one or more units which are stored in a memory and are executed by at least one processor, the one or more units comprising:
   an image segmenting unit configured to segment input 2D video into work clips in units of cuts;
   an object region determining unit configured to determine an object region extracted from each of the work clips;
   an object depth value determining unit configured to determine a depth value of each of the extracted object regions, wherein the object depth value determining unit determines a maximum depth value and a minimum depth value of each of the object regions extracted from the work clips and displays a top view (or a planar image) visualizing the object regions having the determined maximum depth values and minimum depth values, in a 3D space viewed from above at a right angle, wherein the top view includes a plurality of polygons having different sizes and positions according to the determined maximum depth values and minimum depth values of objects, wherein object regions with a minimum depth value appear at the bottom of the top view and object regions with a maximum depth value appear at the top of the top view; and
   a stereoscopic conversion work directives generating unit configured to generate stereoscopic conversion work directives for each of the work clips on the basis of object region extraction information including the determined depth value information of each of the extracted object regions.

8. The apparatus of claim 7, wherein the object region determining unit receives a user input for designating an object region of each of the work clips, and manages the object region designated according to the user input in units of layers.

9. The apparatus of claim 7, wherein the object depth value determining unit provides a user interface for designating at least one of a method for providing depth information to an object region extracted from each of the work clips, a maximum depth value of each of the object regions, and a minimum depth value of each of the object regions.

10. The apparatus of claim 7, wherein the object depth value determining unit provides a user interface for changing the sizes and positions of the plurality of polygons and visually changes depth values of the objects by changing the sizes and positions of the plurality of polygons by using the user interface.

11. The apparatus of claim 7, wherein
the stereoscopic conversion work directives generating unit provides the work clips and stereoscopic conversion work directives generated for the work clips to a user interface, and
the stereoscopic conversion work directives includes information of an object region extracted in units of layers from a corresponding work clip, a method for providing depth information to a specific object region, a maximum depth value and a minimum depth value of the specific object region.

* * * * *